Nov. 5, 1940.   F. TOOP   2,220,871
PORTABLE POWER CONVERTING AND APPLYING UNIT
Filed Aug. 9, 1938   2 Sheets-Sheet 1
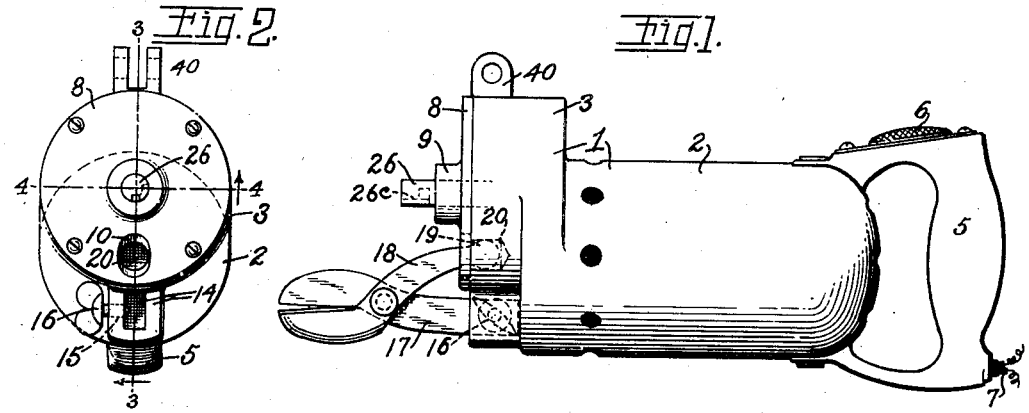
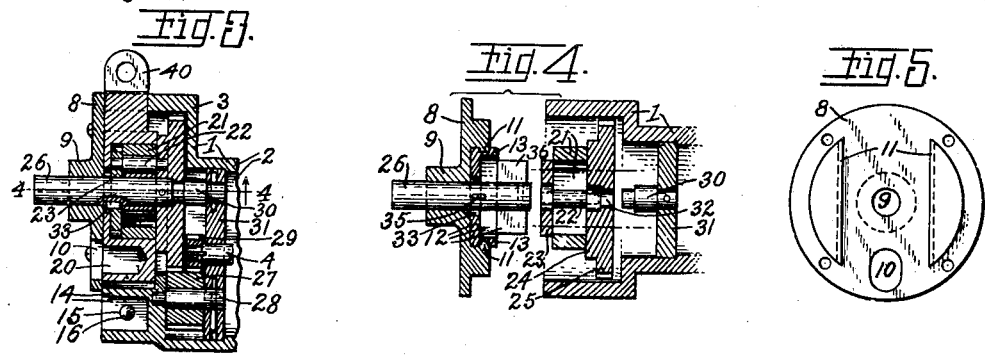
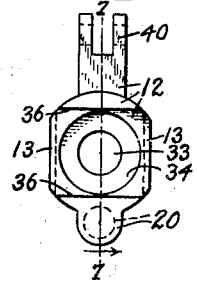
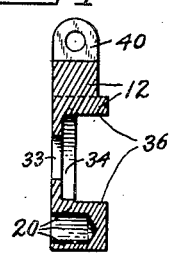
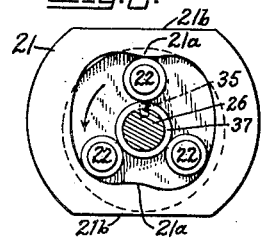
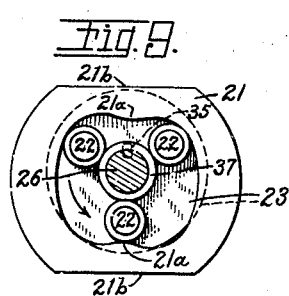
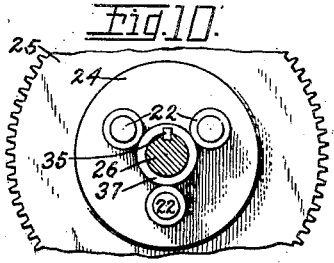
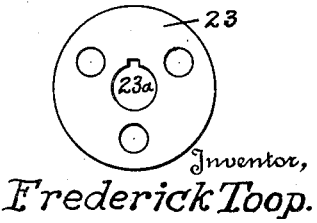
Inventor,
Frederick Toop.
By Sterling P. Buck,
Attorney.

Nov. 5, 1940.   F. TOOP   2,220,871
PORTABLE POWER CONVERTING AND APPLYING UNIT
Filed Aug. 9, 1938   2 Sheets-Sheet 2
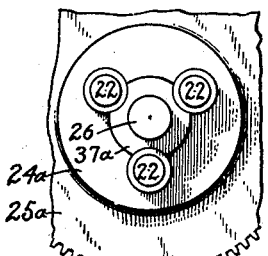
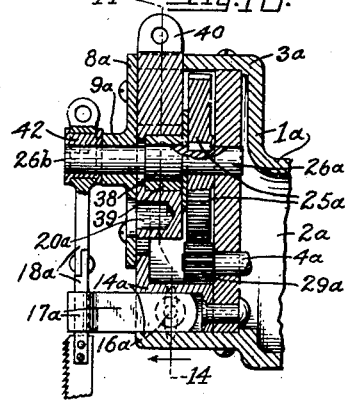
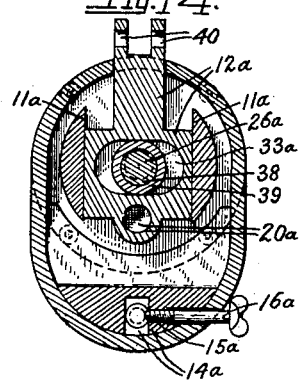
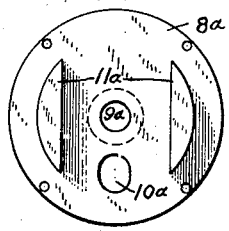
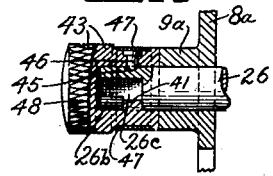
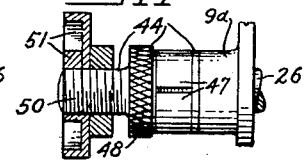
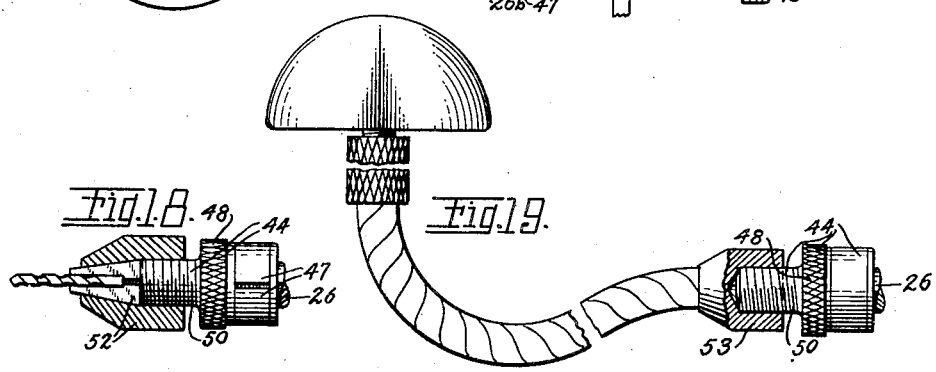
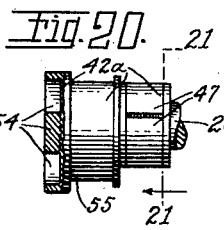
Inventor,
Frederick Toop.
By Sterling P. Buck,
Attorney.

Patented Nov. 5, 1940

2,220,871

UNITED STATES PATENT OFFICE 2,220,871

PORTABLE POWER CONVERTING AND APPLYING UNIT

Frederick Toop, York, Pa., assignor to Petco, Inc., York, Pa., a corporation of Delaware Application August 9, 1938, Serial No. 223,807

3 Claims. (Cl. 172—36)

This invention relates to a portable power producing and transmitting unit, and especially to such unit provided with a handle by which it can be easily carried by a person to different locations and turned in all directions for properly positioning it with respect to objects to be operated upon by a tool carried and driven by such unit.

One object of this invention is to provide a comparatively light, compact and thoroughly practical and effective manipulative unit that is capable of carrying and driving a number of tools of different kinds and varieties that can be alternatively and interchangeably engaged therewith; the gist of this object or purpose being to provide a very convenient and practical unit and attachments by which a large number and variety of mechanical operations and functions can be effected without the expense and worry of bringing a number of machines into use for performing those various operations and functions.

Another object is to provide a very simple, convenient and effective adapter or attachment for coonnection with a rotary shaft of said unit and for carrying different kinds, sizes and shapes of tools to be operated by said unit.

Another object is to provide an improved form of power-transmission element for enabling a single revolution of a shaft to effect several strokes of a reciprocatory actuating member that is normally connected to a tool to be actuated thereby.

Other objects and important features are pointed out or implied in the following details of description, in connection with the accompanying drawings in which:

Fig. 1 is a left-side view of a portable power producing and transmitting unit embodying one form of my invention and having a simple form of shears attached in its operative relation.

Fig. 2 is a front end view of the unit shown in Fig. 1, the shears being omitted.

Fig. 3 is a sectional view of the front end portion of the unit, the section being taken along the line 3—3 of Fig. 2.

Fig. 4 is an "exploded" sectional view showing the arrangement in which the parts would be properly assembled if compressed in the axial direction, viz., along the line 4—4 of Fig. 3, the section being taken along the line 4—4.

Fig. 5 is a rear-side view of the front closure which also serves as a bearing for the main transmission axle or rotary tool-attaching shaft, and as a bearing and guide for the reciprocative actuator or actuating member.

Fig. 6 is a rear-side view of the reciprocative actuator or actuating member.

Fig. 7 is a sectional view of the reciprocative actuator or actuating member, the section being along the line 7—7 of Fig. 6

Fig. 8 is an enlarged detail assembly view of the annular cam, the cooperative rollers, the main transmission shaft, the front bearing-plate for the rollers, and the bearing-sleeve, the shaft being in cross-section, the arrow denoting the direction of the motion of the shaft, plate and rollers with respect to the cam.

Fig. 9 is a view similar to Fig. 8, except that in Fig. 8, one of the rollers is at the uppermost point and holding the cam at its uppermost position; whereas, in Fig. 9, the rollers have been moved by a third of a revolution of the shaft, so one of them is at its lowest point and holding the cam at its lowest position.

Fig. 10 is an enlarged detail assembly view showing a fragment of the major transmission gear-wheel, the rear roller-bearing-element united therewith, the rollers in place, the main transmission shaft united with the gear-wheel and roller-bearing-element, and the roller-bearing-sleeve or roller-backing, the shaft being in cross section.

Fig. 11 is an enlarged detail view of the front bearing-plate.

Fig. 12 is a view similar to Fig. 10, but showing the modification in which the rollers are seated in recesses of the roller-backing on the main transmission shaft.

Fig. 13 is a view similar to Fig. 3, but showing certain modifications that simplify the transmission mechanism, while also showing a sawing tool attached for illustrating one of the numerous applications and uses of the power and transmission unit.

Fig. 14 is a sectional view taken along the line 14—14 of Fig. 13.

Fig. 15 is a rear-side view of the combined closure and bearing-member shown in the modified form of Figs. 13 and 14.

Fig. 16 is a view, partly in section and partly in right-side elevation, showing a shaft-endshield that is applicable and attachable to the front end of the main transmission shaft.

Fig. 17 illustrates an adapter applied on the front end of the main transmission shaft and having an endless-groove-cam applied thereon as one means of operating a tool, to be used instead of the reciprocative actuator of Figs. 6 and 7, in cases where better adapted to the particular kind or shape or size of tool to be used.

Fig. 18 is a view illustrating the adapter of Fig. 17 having a drill-chuck applied thereon.

Fig. 19 illustrates the adapter of Figs. 17 and 18 having attached thereto a tool for hammering dents out of sheet metal.

Fig. 20 illustrates a somewhat different form of adapter, the difference consisting in substituting the excentric and endless-groove-cam of Fig. 20 for the screw-threaded stud of Figs. 17, 18 and 19.

Fig. 21 is a sectional view along the line 21—21 of Fig. 20.

Reference to Figs. 16 and 21 show that the internal construction and a part of the external construction of the adapter and the shaft-end shield is the same; and this applies to all the Figs. 16 to 21 inclusive.

Referring to these drawings in detail, wherein, similar reference numerals refer to similar parts throughout the several views, the invention is described in detail as follows:

Figs. 1 to 11, inclusive, relate to the same form of invention, and will be described first. The unitary casing 1 includes offset hollow parts 2 and 3; the part 2 being the motor-casing and having therein an electric motor of any appropriate type or kind, not shown with exception of the front end portion of the motor-shaft 4 (Fig. 3); and the handle 5, with its controlling switch 6 and power-connecting terminals 7, is united with the casing 2. The part 3 has a closure 8 removably secured thereto by the screws shown or by any appropriate means; and this closure is provided with a central journal-bearing 9 and with an excentric opening 10 that is normally below the opening or bearing 9. The inner or rear side of the closure is provided with parallel guides 11 (Fig. 5) between which is normally seated the reciprocative member 12, the parallel edges 13 of the latter being slidably engaged with the undercut or grooved guides 11 in proper relation to prevent relative movement of these members 8 and 12 except in a straight line, normally upward and downward or towards and from a tool-supporting element or socket 14 whose wall is apertured and internally screw-threaded at 15 for holding a screw 16 that can be screwed inward to engage with a primary tool-member of the type shown at 17 in Fig. 1, and at 17a in Fig. 13 the above term "primary" being used arbitrarily as a means of distinguishing from the similar ones; such being herein arbitrarily termed the "secondary" tool-member, and the same has a globular or arcuate end portion 19 that fits into a tool-attaching element or socket 20 of the reciprocative member 12, for operation by the latter as hereinafter explained. The tool-connecting element or socket-element 14 is shown as formed integrally with the parts 2 and 3 of Figs. 1, 2 and 3; but it may be formed as a primarily separate part and riveted or otherwise secured in place, as indicated at 14a in Figs. 13 and 14.

The power-transmission mechanism of Figs. 1 to 11 includes the reciprocative actuating member 12 of Figs. 3, 4, 6 and 7; the annular cam-member 21, triangularly arranged rollers 22 in their illustrated cooperative relation to the cam-member, the roller-bearing-elements 23; the major gear-wheel 25 with which the bearing element 24 is united; the main transmission shaft 26 with which the parts 24 and 25 are united; an idler or gear-wheel 27 rotatable on a fixed axle 28 (Fig. 3); and a minor or relatively small gear or pinion 29 fixed on or integral with the motor-shaft 4 and in mesh with the idler 27 while the latter is in mesh with the major or relatively large gear-wheel 25.

In Figs. 3 and 4 it is seen that the shaft 26 does not extend entirely through the unitary member 24—25, and that its rear or inner end is met by a supporting or bearing stud 30 that is fixed in a partition or wall 31 of the casing 1, the front end of this pivotal support being fitted in a central cavity 32 of the major gear-wheel 24—25, so the latter is journaled on the stud 30 as well as united with the shaft 26 which it turns when operated by the motor, through the medium of the transmission gears 27 and 29; that is, the wheel 24—25 is in gear with wheel 29 through the medium of idler-wheel 27.

The actuating member 12 has a central opening 33 which is considerably larger than the cross-section of the shaft 26, so it can move freely upward and downward while the shaft 26 extends therethrough. The member 12 is also provided with an annular cavity 34 of considerably greater diameter than the disc or bearing-plate 23 that is seated therein, so that it does not interfere with the reciprocative movement of the member 12. The member 23 has a central opening 23a that fits snugly around the shaft 26 and is keyed to the latter by means of a key 35 in a key-seat of the opening 23a; so, this structure in combination with the bearing element 24 secures the rollers 22 in parallel relation to the cam-protrusions while the upper and lower plane and parallel surfaces 21b are slidingly fitted between the parallel guides 36 of the actuating member 12. The sliding movement of the member 21 across the member 12 is very slight, only enough to compensate for any slight unevenness or irregularity in the cam-face; so, it may be found practical to make the cam so nearly perfect that the sliding connection 21b—36 may be omitted from the structure.

For cooperation with the journals of the rollers 22, in holding the rollers in their operative relation with the cam-member 21, I may provide a backing member 37 which may be either integral with the shaft 26 or a hollow cylinder fitted around said shaft and abutting against the rollers 22 so as to relieve pressure and minimize wear of the journals and journal-bearings of the rollers.

Where there is only a slight difference between the respective members in Figs. 1 to 11 and those in Figs. 12 to 21, the same respective numerals are used with addition of a letter in these last ten figures; for instance, in Figs. 12 to 15, the unitary casing 1a has an offset front portion or gear-casing 3a, only a small part of the motor-casing 2a and motor-shaft 4a being shown. The closure 8a is formed with a central bearing 9a, an excentric opening 10a, and upright parallel actuator-guides 11a. The member 12a has a horizontally disposed oblong opening 33a through which the shaft 26a extends; but in lieu of the parts 21, 22, 23, 24 and 37 (of Figs. 8, 9, 10 and 11), I here provide an excentric 38 within a friction-reducing annular bearing 39 which may be of any preferred and proper material, construction or type, being here shown in simplest form to avoid confusion in the drawings, and which will probably be of some roller-bearing type in practice. The bearing 39 is fitted for close but easy working movement around the excentric 38 and between the parallel upper and lower walls of the opening 33a, the ends of this opening providing ample clearance to permit the bulge of the excentric to pass unobstructedly therethrough; so, when the shaft 26a is rotated, its excentric effects a reciprocative motion of the actuator 12a toward and from the tool-attaching element 14a.

In this form of the invention, the major gearwheel 25a is immediately or directly geared to or meshed with the minor gear-wheeel 29a which is united with the motor-shaft 4a.

The actuator 12 or 12a (either or both) may be provided with an upper end portion 40 that forms a tool-attaching element which may be of the form shown or of any appropriate form.

Comparing the mechanism for converting rotary motion into reciprocative motion, as disclosed in Figs. 3 to 12, with the somewhat similar mechanism disclosed in Figs. 13 and 14; it will be apparent that the latter mechanism is composed of fewer parts, hence, is less expensive, while being extremely durable in consequence of its excentric 38 being fitted in the friction-minimizing member 39 whose periphery is of relatively large area so that the wear is widely distributed and not likely to cause over-heating or rupturing of the wearing surfaces. However, it is noted that this latter form is capable of producing only one reciprocative cycle for each rotation or rotative cycle of the transmission shaft 26d; whereas, the mechanism of Figs. 3 to 12 is capable of producing three reciprocative cycles to each rotative cycle of the transmission shaft 26; and there are many operations in which the larger number of reciprocative cycles is of importance. On the other hand, there are many operations where it is desirable that the transmitted power of the shaft shall be relatively great, and in such cases its speed must be reduced by the gearing between it and the motor (according to well-known physical laws), and in such case, the number of reciprocative cycles would be accordingly reduced. Such reduction of the reciprocative cycles would, in most or many cases, be inefficient or undesirable; so the structure of Figs. 3 to 12 avoids or precludes such inefficiency by its capability of producing a number of reciprocative cycles for each rotative cycle; and though the illustrated mechanism shows three of the rollers 22, representing three reciprocative cycles, a greater or less number may be employed if found desirable in constructing any such power transmitting mechanism. In broad terms, the mechanism of Figs. 3 to 12 may properly be called stroke-multiplying mechanism, a stroke and a reciprocative cycle being synonymous in the present connection.

A rotary tool-attaching element 26b consists of the front end portion of the transmission shaft 26 and/or 26a, this element being formed with a bayonet-slot 26c for receiving a lug or keeper 41 (Figs. 16 and 21) of a tool-actuating excentric 42 or 42a (Figs. 13, 20 and 21); of a shaft-end-guard 43 (Fig. 16); and a tool-connecting adapter 44 (Figs. 17, 18 and 19). The shaft-end is also provided with a depression or keeper-seat 45 for receiving the bulged inner end of a stud or keeper 46 that is movably seated in an apertured wall of the hollow member 43 and there yieldingly held in the depression 45 by an annular spring 47; and while these parts 45 and 46 are shown only in the sectional views of Figs. 16 and 21, they are also present within the parts 44 of Figs. 17, 18, 19 and 20. The knurled portions 48 are provided for conveniently manipulating these shaft-end attachments for turning and pushing or pulling them when pressing them onto or pulling them off of the shaft. It is believed to be obvious how the keepers 26c and 46 cooperate in preventing accidental displacement of the shaft-end attachments.

The adapters 44 are each formed with a screw-stud 50 for attachment of any one of the tool-actuating members shown at 51, as an annular or endless-groove cam, or at 52, as a drill-chuck; or at 53, as a flexible shaft connection. In Figs. 20 and 21, the shaft-end attachment 42a is formed integrally with an endless-groove cam 54 and an excentric 55, and these tool-attaching elements may be used either simultaneously or alternatively, according to the kind and type of tool to be operated thereby.

Although I have described these different forms of my invention specifically, I do not intend to limit my patent protection to these precise details of construction and arrangement, for the invention is susceptible of numerous changes within the scope of the inventive ideas as implied and claimed.

What I claim as my invention is:

1. In a portable power converting and applying unit, the combination of a motor including a motor-shaft and also including a casing which has a tool-attaching element at its front end, said tool-attaching element being adapted to engage with and support a primary member of a tool that comprises a secondary member movably connected to the primary member for co-operation in performing the tool's function, an actuating member that is movably connected to the front end of said casing and provided with means for operatively connecting the secondary member of said tool thereto, and power-transmitting means operatively connected to said actuating member and to said motor-shaft so as to effect the operation and function of said tool by the operation of said motor, said front end of the casing being inclusive of a removable closure that is provided with parallel guides and with a journal-bearing between the said guides, said actuating member being slidably seated between said guides in a proper relation for having reciprocative motion towards and from said tool-attaching element, said power-transmitting means being inclusive of a shaft that is journaled in said journal-bearing of said removable closure and which shaft has means thereon to effect said reciprocative motion of said actuating member.

2. In a portable power converting and applying unit, the combination of a motor including a motor-shaft and also including a casing which has a tool-attaching element at its front end, said tool attaching element being adapted to engage with and support a primary member of a tool that comprises a secondary member movably connected to the primary member for cooperation in performing the tool's function, an actuating member that is movably connected to the front end of said casing and provided with means for operatively connecting the secondary member of said tool thereto, and power-transmitting means operatively connected to said actuating member and to said motor shaft, so as to effect the operation and function of said tool by the operation of said motor, said actuating member having tool-attaching elements at different distances from the first said tool-attaching element, so as to provide for attaching tools of different kinds and shapes and sizes in their respective operative relations.

3. In a portable power converting and applying unit, the combination of a motor including a motor-shaft and also including a casing which has a tool-attaching element at its front end, said tool attaching element being adapted to engage with and support a primary member of a tool that comprises a secondary member movably connected to the primary member for cooperation in performing the tool's function, an actuating member that is movably connected to the front end of said casing and provided with means for operatively connecting the secondary member of said tool thereto, and power-transmitting means operatively connected to said actuating member and to said motor-shaft so as to effect the operation and function of said tool by the operation of said motor, said power-transmitting means being inclusive of a tool-connecting or tool-attaching rotary shaft, and a relatively large gear-wheel united with one another, and a relatively small gear-wheel on said motor-shaft and in gear with said relatively large gear-wheel in a proper relation to effect fewer rotations of the tool-connecting rotary shaft than the number of revolutions of rotations of said motor-shaft during a given period of time, said tool-connecting shaft being inclusive of an end that protrudes through and beyond the front end of said casing and is provided with means for interchangeably attaching tool-members and tool-actuating members thereto, substantially as described.

FREDERICK TOOP.